United States Patent
Kim et al.

(10) Patent No.: US 8,295,241 B2
(45) Date of Patent: Oct. 23, 2012

(54) APPARATUS AND METHOD FOR SUPPORTING PEER TO PEER COMMUNICATION IN A BROADBAND WIRELESS COMMUNICATION SYSTEM

(75) Inventors: Bong-Chan Kim, Suwon-si (KR); Song Chong, Seongnam-si (KR); Soon-Young Yoon, Seoul (KR); Ji-Hyun Lee, Seongnam-si (KR); Joo-Hyun Lee, Seoul (KR); Young-Ki Kim, Daejeon (KR); Kyu-Ho Son, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 367 days.

(21) Appl. No.: 12/755,697

(22) Filed: Apr. 7, 2010

(65) Prior Publication Data
US 2010/0254281 A1 Oct. 7, 2010

(30) Foreign Application Priority Data
Apr. 7, 2009 (KR) ........................ 10-2009-0029718

(51) Int. Cl.
*H04W 4/00* (2009.01)
*H04L 12/26* (2006.01)
*H04B 7/00* (2006.01)
*G06F 15/173* (2006.01)

(52) U.S. Cl. ......... 370/329; 370/252; 455/509; 709/226

(58) Field of Classification Search ........................ None
See application file for complete search history.

(56) References Cited

U.S. PATENT DOCUMENTS
7,206,934 B2 * 4/2007 Pabla et al. .................. 713/168
2005/0021758 A1 * 1/2005 White ........................... 709/226

* cited by examiner

Primary Examiner — Clemence Han
(74) Attorney, Agent, or Firm — Jefferson IP Law, LLP (57) ABSTRACT

An apparatus and method for supporting Peer to Peer (P2P) communication in a broadband wireless communication system are provided. A P2P zone within a frame used for the P2P communication includes at least one channel, each channel includes a broadcasting zone and a contention zone, and a P2P-mode transmit Mobile Station (MS) transmits a reference signal through a broadcasting zone of a channel to which itself belongs. The method MS includes determining an interference sum for each channel within the P2P zone, comparing the determined interference sums with each other, selecting a channel having the least interference sum, and transmitting information regarding the selected channel to a Base Station (BS).

24 Claims, 7 Drawing Sheets

APPARATUS AND METHOD FOR SUPPORTING PEER TO PEER COMMUNICATION IN A BROADBAND WIRELESS COMMUNICATION SYSTEM

PRIORITY

This application claims the benefit under 35 U.S.C. §119 (a) of a Korean patent application filed in the Korean Intellectual Property Office on Apr. 7, 2009 and assigned Serial No. 10-2009-0029718, the entire disclosure of which is hereby incorporated by reference.

BACKGROUND OF THE INVENTION

1. Field of the Invention

The present invention relates to a broadband wireless communication system. More particularly, the present invention relates to an apparatus and method for supporting Peer to Peer (P2P) communication between Mobile Stations (MSs) in a broadband wireless communication system.

2. Description of the Related Art

A conventional MS performs direct communication with a Base Station (BS) using radio resources managed by the BS in a cellular communication system. In other words, to perform mutual communication, two Mobile Stations (MSs) each have to form a connection with a BS and be allocated UpLink (UL) and DownLink (DL) radio resources from the BS. The BS receives data from one MS through a corresponding connection, and transmits the data to the other MS through a separate connection.

A Peer to Peer (P2P) scheme is another scheme for performing mutual communication between two MSs. The P2P is a scheme for forming direct connection to perform communication between the two MSs. In the P2P, the two MSs directly transmit/receive a signal between themselves.

The P2P scheme may increase resource utilization efficiency because a high data rate is obtained in a case where a transmit MS and a receive MS are adjacent to each other. Commonly, a BS provides resource allocation for P2P communication in a legacy system supporting P2P. That is, the legacy system allocates resources through a BS-centralized scheme. In this case, a problem exists in which a large overhead results because a large amount of information may be exchanged between the BS and each MS.

In the BS-centralized P2P resource allocation scheme, a BS should be aware of a channel gain for all P2P communications (or connections) and, in a case of permitting simultaneous transmission, the BS should be aware of interference between all P2P transmissions. Therefore, an overhead resulting from information exchange between the BS and an MS is large. In a case where the BS allocates P2P resources in the BS-centralized scheme as described above, a problem exists in that complexity is large and realization is difficult.

Therefore, a need exists for an apparatus and method for reducing overhead for P2P communication in a wireless communication system.

SUMMARY OF THE INVENTION

An aspect of the present invention is to address at least the above-mentioned problems and/or disadvantages and to provide at least the advantages below. Accordingly, an aspect of the present invention is to provide an apparatus and method for reducing overhead for Peer to Peer (P2P) communication in a wireless communication system.

Another aspect of the present invention is to provide an apparatus and method for allocating P2P resources through a dispersive scheme in a wireless communication system.

A further aspect of the present invention is to provide an apparatus and method for allocating a plurality of channels for P2P communication, and allowing Mobile Stations (MSs) operating in a P2P mode to competitively communicate with each other within a selected channel in a wireless communication system.

Yet another aspect of the present invention is to provide an apparatus and method for allocating a plurality of channels for P2P communication, and allowing an MS operating in a P2P mode to select a channel using an interference sum of each channel in a wireless communication system.

Another aspect of the present invention is to provide an apparatus and method for coordinating a resource zone for P2P communication adaptively to a P2P communication (or connection) count in a wireless communication system.

Still another aspect of the present invention is to provide an apparatus and method for allocating a plurality of channels for P2P communication, and coordinating the number of P2P transmissions participating in contention within one channel in a wireless communication system.

The above aspects are addressed by providing an apparatus and method for supporting P2P communication in a broadband wireless communication system.

In accordance with an aspect of the present invention, an operation method of an MS in a wireless communication system supporting P2P communication is provided. A P2P zone within a frame used for the P2P communication includes at least one channel, each channel includes a broadcasting zone and a contention zone, and a P2P-mode transmit MS transmits a reference signal through a broadcasting zone of a channel to which itself belongs. The method includes determining an interference sum for each channel within the P2P zone, comparing the determined interference sums with each other, selecting a channel having the least interference sum, and transmitting information regarding the selected channel to a Base Station (BS).

In accordance with another aspect of the present invention, an operation method of a BS in a wireless communication system supporting a P2P mode is provided. The method includes determining a channel count within a P2P zone adaptively to a currently set P2P connection count, and variably assigning a P2P zone to a frame duration according to the determined channel count.

In accordance with yet another aspect of the present invention, an MS apparatus in a wireless communication system supporting P2P communication is provided. A P2P zone within a frame used for the P2P communication includes at least one channel, each channel includes a broadcasting zone and a contention zone, and a P2P-mode transmit MS transmits a reference signal through a broadcasting zone of a channel to which it belongs. The apparatus includes a P2P channel interference measurer, a P2P communication controller, and a message processor. The P2P channel interference measurer determines an interference sum for each channel within the P2P zone. The P2P communication controller compares the determined interference sums with each other, and selects a channel having the least interference sum. The message processor transmits information regarding the selected channel to a BS.

In accordance with still another aspect of the present invention, a BS apparatus in a wireless communication system supporting a P2P mode is provided. The apparatus includes a P2P zone manager and a scheduler. The P2P zone manager determines a channel count within a P2P zone adaptively to a currently set P2P connection count. The scheduler variably assigns a P2P zone to a frame duration according to the determined channel count.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and method for reducing overhead for Peer to Peer (P2P) communication in a wireless communication. More particularly, exemplary embodiments of the present invention provide an apparatus and method for a Base Station (BS) to allocate a plurality of channels for P2P communication (or connection), and for P2P Mobile Stations (MSs) to select a favorable channel through a simple measurement and competitively communicate with each other within the selected channel.

In an exemplary implementation, an Orthogonal Frequency Division Multiplexing/Orthogonal Frequency Division Multiple Access (OFDM/OFDMA)-based broadband wireless communication system is described below. However, other wireless communication systems supporting P2P communication may also be applicable.

Figure 1:
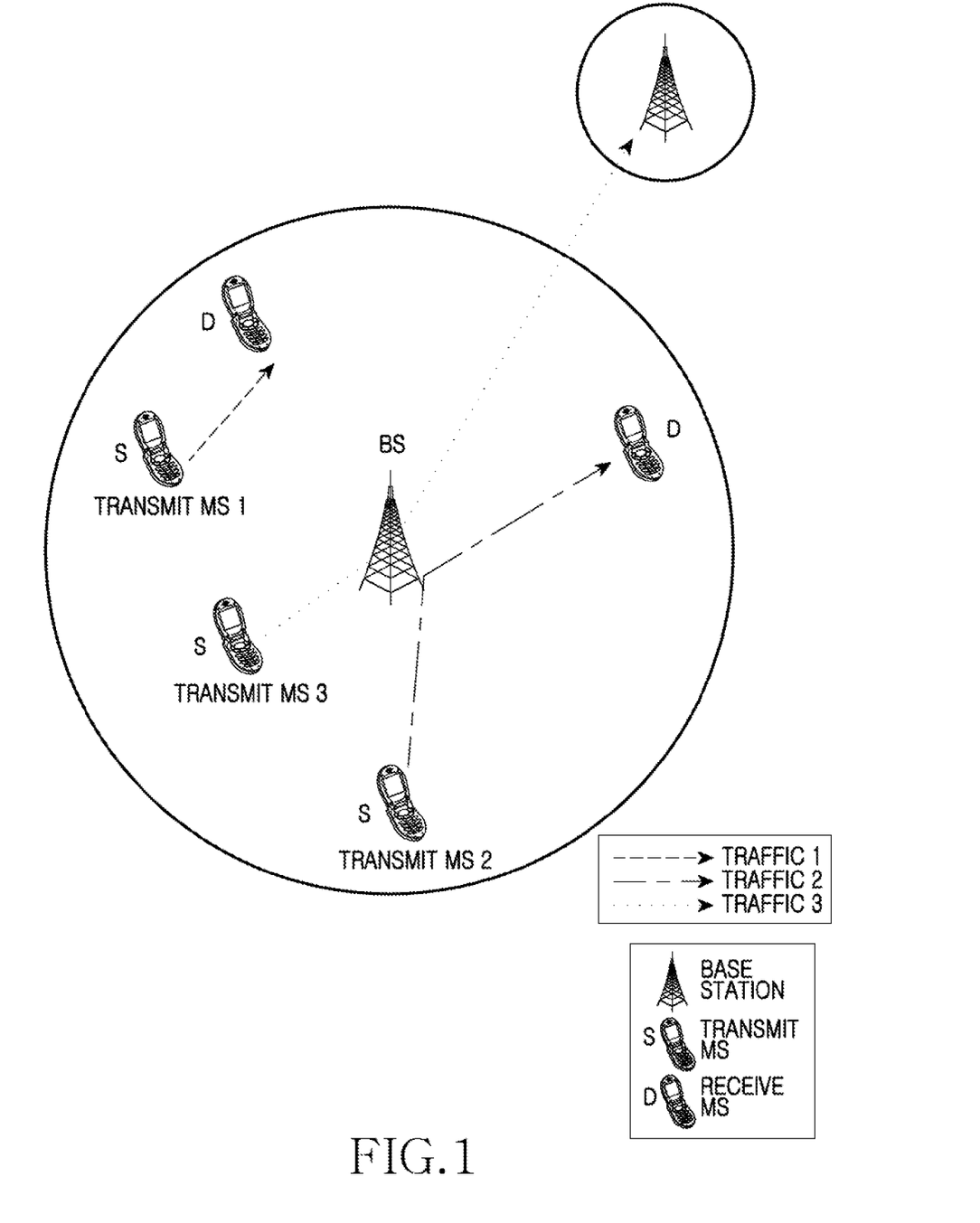
FIG. 1 is a schematic diagram illustrating Peer to Peer (P2P) communication in a broadband wireless communication system according to an exemplary embodiment of the present invention.

FIG. 1 is a schematic diagram illustrating P2P communication in a broadband wireless communication system according to an exemplary embodiment of the present invention.

Referring to FIG. 1, in a case of traffic 2 communication, a transmit MS 2 and a receive MS exist within the same cell and communicate with each other over a long distance through a BS. In a case of traffic 3 communication, a transmit MS 3 and the receive MS exist in a different cell and communicate with each other through the BS. In a case of traffic 1 communication, a transmit MS 1 and a receive MS exist within the same cell and directly communicate with each other over a short distance not through the BS. Here, the traffic 1 communication is P2P communication. In the traffic 1 communication, the transmit MS and the receive MS directly form a connection and communicate with each other. In an exemplary implementation, the BS allocates a resource zone (including at least one channel) for P2P communication adaptively to a P2P connection. Also, P2P-mode MSs select a favorable channel through simple interference measurement, competitively acquire resources within the selected channel, and perform communication with each other.

Figure 2:
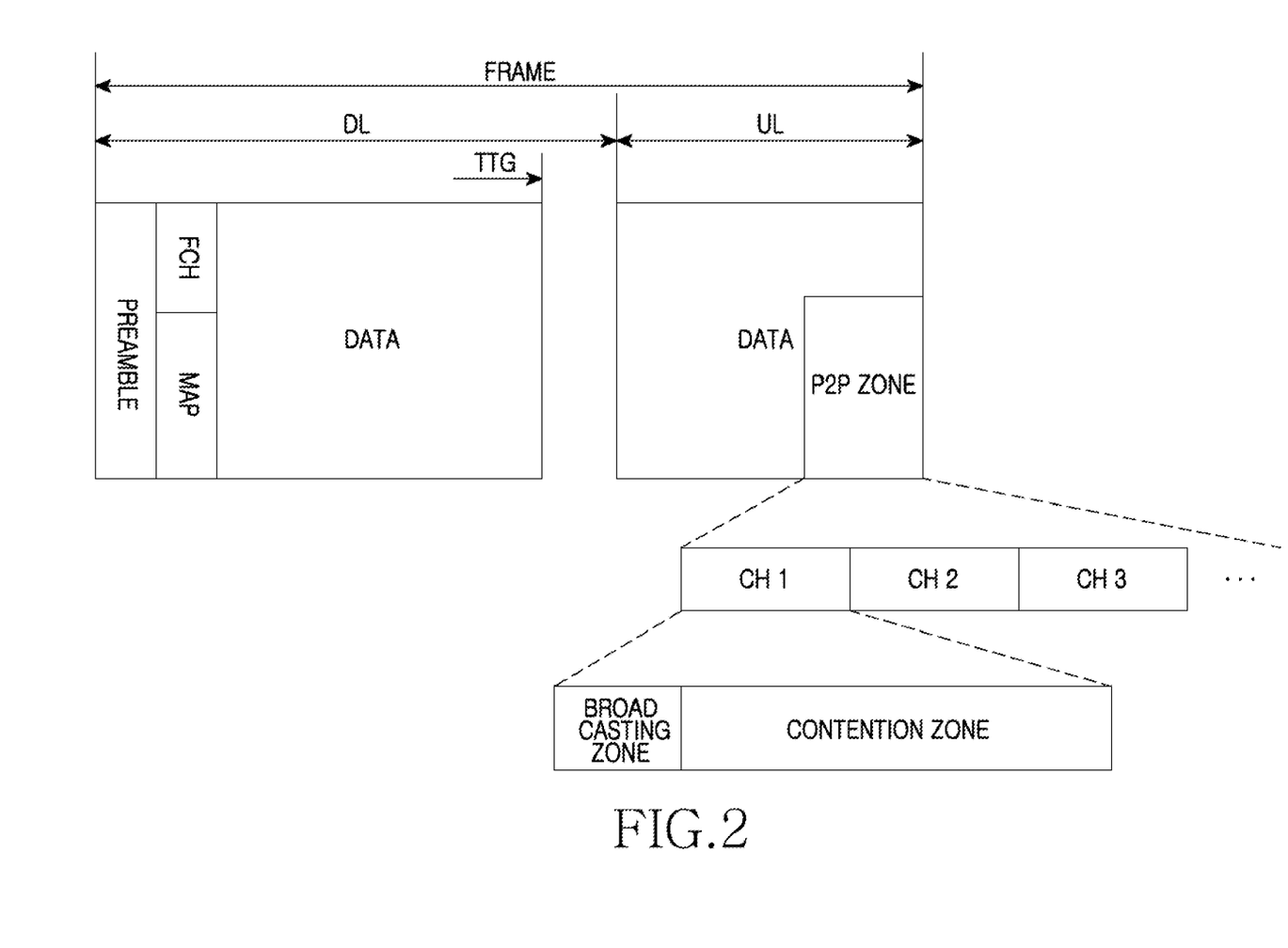
FIG. 2 is a diagram illustrating a frame structure for supporting P2P communication according to an exemplary embodiment of the present invention.

FIG. 2 is a diagram illustrating a frame structure for supporting P2P communication according to an exemplary embodiment of the present invention. The frame structure illustrated in FIG. 2 is merely one example, but may be variously embodied by a standard and an operator.

Referring to FIG. 2, a frame is constituted of a DownLink (DL) duration and an UpLink (UL) duration. At the very beginning of the DL duration, a preamble for synchronization of an MS, channel estimation, and cell identification (or BS identification) is transmitted. A Frame Control Header (FCH) message including basic structure information of the frame and a MAP message including DL/UL resource allocation information is transmitted. On the other hand, at a remaining zone of the DL duration, at least one DL burst (or packet) including a control message (i.e., a signaling message) or traffic may be transmitted.

At the very beginning of a UL duration, a control channel signal (e.g., a Channel Quality Indicator CHannel (CQICH) signal, an ACKnowledgement CHannel (ACKCH) signal, a ranging signal, and the like) including a UL control signal may be transmitted. At a remaining zone of the UL duration, at least one UL burst including a control message or traffic may be transmitted.

For example, it is assumed herein that a zone for P2P communication (i.e., a P2P zone) exists in a UL duration. As illustrated, the P2P zone may include at least one channel (ch1, ch2, ch3, . . . ), and each channel may be comprised of a broadcasting zone and a contention zone. Here, the broadcasting zone is a zone at which a receive MS measures an interference sum for each channel. Through the broadcasting zone, all transmit MSs may transmit predefined reference signals (e.g., called preamble signals, pilot signals, sounding signals, and the like) at the same transmit power. The contention zone is a zone at which P2P communications belonging to corresponding channels acquire resources through contention and actually communicate data.

If P2P communication (or connection) is set between a transmit MS and a receive MS, the receive MS shall select a channel to communicate with the transmit MS. At this time, the receive MS measures an interference sum (e.g., a Received Signal Strength Indicator (RSSI) sum) at a broadcasting zone of each channel, and selects a channel of a least interference sum. If the receive MS informs a BS of the selected channel, the BS shall inform the transmit MS of the selected channel. The transmit MS and the receive MS then perform communication with each other through the selected channel.

Figure 3:
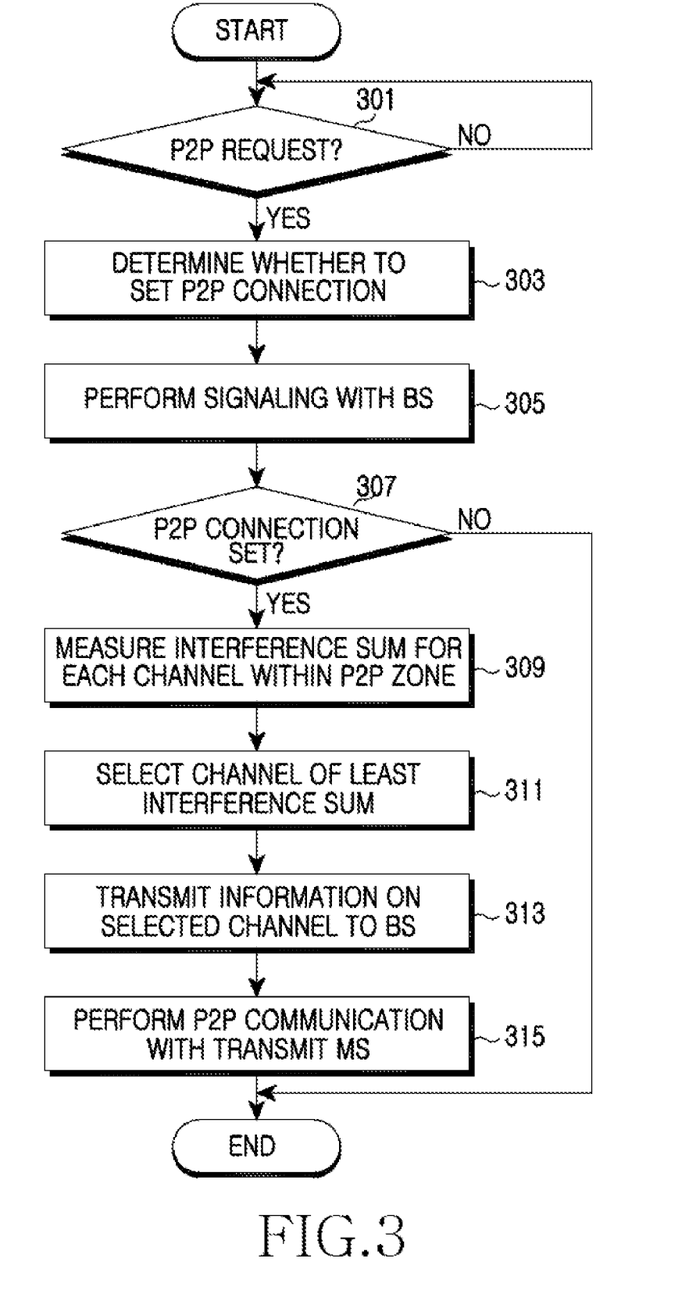
FIG. 3 is a flow diagram illustrating a procedure of channel selection of a receive Mobile Station (MS) in a wireless communication system supporting P2P according to an exemplary embodiment of the present invention.

FIG. 3 is a flow diagram illustrating a procedure of channel selection of a receive MS in a wireless communication system supporting P2P according to an exemplary embodiment of the present invention.

Referring to FIG. 3, in step 301, the receive MS determines if a P2P request is received. Here, the P2P request may be received from a BS. If P2P requests are received from several transmit MSs at the same time, the BS may inform the receive MS of only one of the P2P requests, and process the remaining P2P requests from a next slot in sequence.

If the P2P request is received in step 301, the receive MS shall proceed to step 303. In step 303, the receive MS determines whether to set a P2P connection. That is, the receive MS determines if the P2P communication has a gain. For example, the receive MS may compare an RSSI (or a link measurement value) of a signal received from the BS with the RSSI of a signal received from a corresponding transmit MS, and select a link having a gain.

In step 305, the receive MS informs the BS of P2P connection setting information, and exchanges necessary signaling with the BS. At this time, in a case where the P2P connection setting is determined, the receive MS may receive information on a P2P zone (i.e., a position and size of the P2P zone, the number of channels belonging to the P2P zone, information on a transmit MS belonging to each channel, and the like) from the BS. For example, the receive MS may receive the P2P zone information through a broadcast message (e.g., a Downlink Channel Descriptor (DCD) message, a MAP message, and the like), a unicast message, or a multicast message.

In step 307, the receive MS determines if the P2P connection is set. If the P2P connection is set, the receive MS shall proceed to step 309 and measure an interference sum (e.g., an RSSI sum) received at each channel, using a broadcasting zone of each channel included within the P2P zone (i.e., P2P duration). That is, at the broadcasting zone of each channel, all transmit MSs belonging to corresponding channels may transmit defined reference signals (e.g., preamble signals), and the receive MS may measure an RSSI of the signal received at each broadcasting zone and determine an interference sum of each channel.

In step 311, the receive MS compares all of the measured interference sums of respective channels with each other and selects a channel of the least interference sum for P2P communication. Here, an operation for the channel selection may be given in Equation 1 below.

$$\text{channel} = \arg\min_{k \in B | n_k < n_{max}} \sum_{j \in S_k} I_{ji} \quad (1)$$

In Equation 1, 'B' denotes a set of all P2P channels assigned by the BS, 'k' denotes a channel index, '$n_k$' denotes the total number of P2P communications (connections) belonging to channel (k), '$S_k$' denotes a set of all transmit MSs belonging to the channel (k), '$n_{max}$' denotes the maximum number of P2P communications, which one channel may have, and 'I' denotes a level of interference (e.g., an RSSI), which a transmit MS (j) exerts on a receive MS (i).

Based on Equation 1 above, the receive MS may measure an interference sum for each channel in which the number of P2P communications belonging to the corresponding channels is equal to or is less than the maximum number of P2P communications ($n_{max}$), and select a channel of the least interference sum.

After selecting the channel of the least interference sum, the receive MS proceeds to step 313. In step 313, the receive MS transmits information regarding the selected channel to a BS. Accordingly, the BS may inform a corresponding transmit MS of the selected channel. In step 315, the receive MS performs P2P communication with the transmit MS through the selected channel. At this time, the receive MS and the transmit MS may perform communication through contention within the selected channel. For example, a scheme of resource acquisition for P2P communication within one channel may be a Carrier Sense Multiple Access (CSMA) of an ad-hoc network. Thereafter, the receive MS terminates the procedure.

As described above, in a case where interference that P2P communications exert on each other is less than a preset value due to a long distance, a channel may be determined as being idle, and simultaneous transmission through the idle channel may be performed. However, if the interference that the P2P communications exert on each other is greater than the preset value, a channel may be determined as being busy, and communication through the busy channel may not be performed. By performing simultaneous transmission as described above, P2P communications of less mutual interference are able to obtain a gain of space reuse.

On the other hand, a receive MS selecting a channel and performing P2P communication as illustrated in FIG. 3 may scan P2P channels at regular intervals (or according to an event or request) and change a channel in a dynamic fashion. That is, the receive MS may measure interference received through a broadcasting zone of each channel, and perform a channel change into a channel of less interference using the measured interference of each channel.

Here, when the receive MS measures interference received at a broadcasting zone of a channel to which it belongs, the receive MS needs an operation for removing interference of a transmit MS communicating with itself. That is, the receive MS multiplies a previously acquainted transmit power of the transmit MS by a channel gain between the transmit MS and itself, and subtracts the multiplication result from an interference sum received through a channel to which it belongs. The receive MS selects a channel of the least interference sum as shown in Equation 1 above. In a case where the selected channel is different from a previous in-communication channel, the receive MS may perform a channel change into the selected channel using a constant probability value (ρ) (i.e., a preset value). For example, assuming that the probability value (ρ) is equal to 0.7, the receive MS may generate a random number and, when the random number is greater than 0.7, may perform a channel change. A channel change into a channel of a less interference sum is not always performed as described above because, in a case where several P2P communications perform simultaneous channel change, states of the changed channels may become worse. If the channel change is determined, the receive MS may inform a BS of the changed channel, and the BS may notify the transmit MS of the changed channel.

Figure 4:
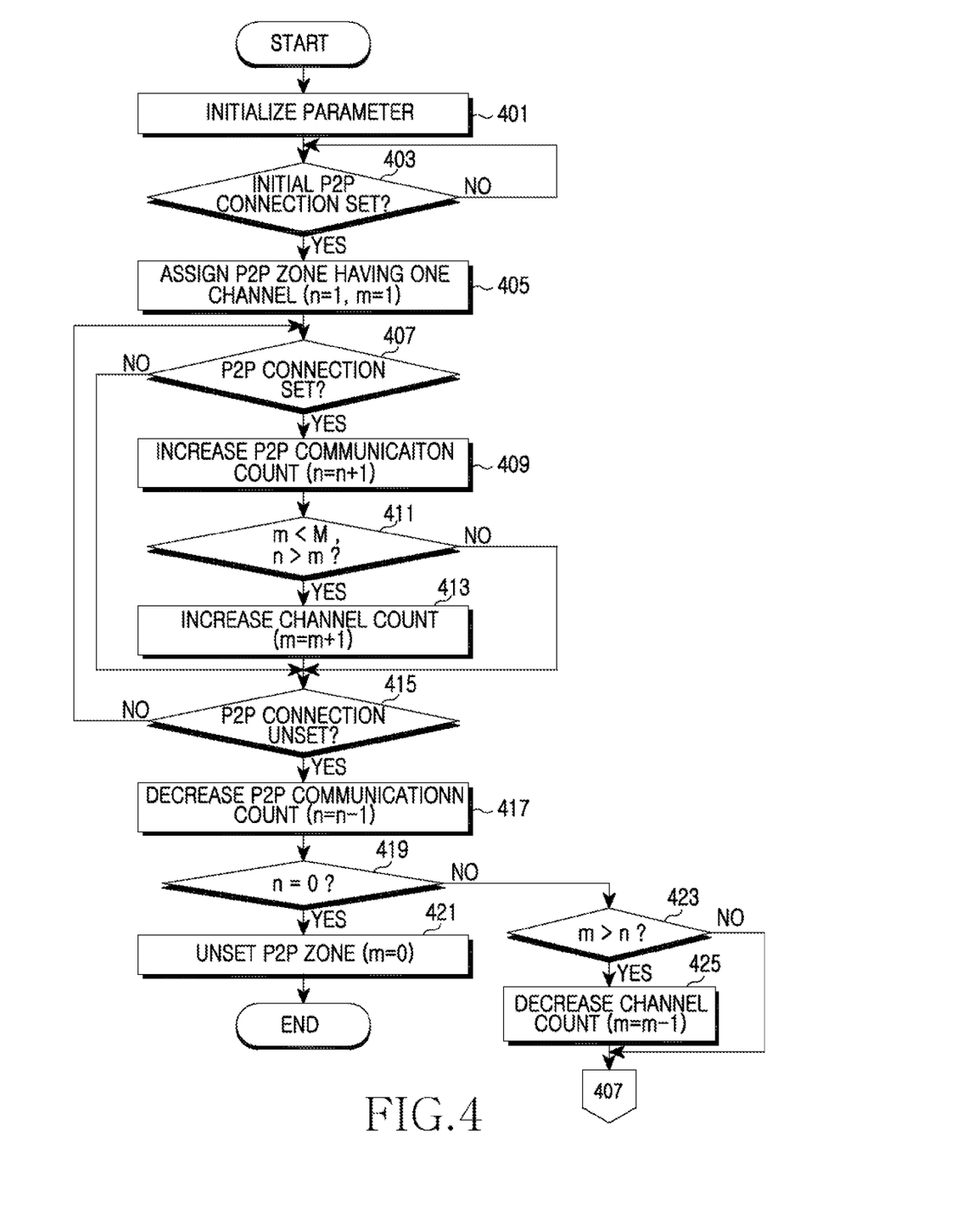
FIG. 4 is a flow diagram illustrating a procedure of P2P zone allocation of a Base Station (BS) in a wireless communication system supporting P2P communication according to an exemplary embodiment of the present invention.

FIG. 4 is a flow diagram illustrating a procedure of P2P zone allocation of a BS in a wireless communication system supporting P2P communication according to an exemplary embodiment of the present invention.

Referring to FIG. 4, in step 401, the BS initializes a parameter. For example, the BS initializes a parameter (n) representing a P2P communication count by '0', and initializes a parameter (m) representing a channel count within a P2P zone by '0'.

In step 403, the BS determines if an initial P2P connection is set. If the initial P2P connection is set, the BS may proceed to step 405. In step 405, the BS allocates a P2P zone having one channel. At this time, the parameter (m) increases to '1' and the parameter (n) increases to '1'. Here, the P2P zone may be allocated to a UL duration as illustrated in FIG. 2.

In step 407, the BS determines if a new P2P connection is set. If the new P2P connection setting is determined, the BS may proceed to step 409. Otherwise, if the new P2P connection setting is not determined, the BS proceeds to step 415. In step 409, the BS increases the P2P communication count (n) by '1' (i.e., n=n+1). In step 411, the BS determines if the current channel count (m) is less than the maximum channel count (M), and is less than the P2P communication count (n).

If the condition of step 411 is satisfied, in step 413, the BS may increase the channel count (m) by '1' (i.e., m=m+1) and allocate a P2P zone including channels of an 'm' number, and proceed to step 415. However, if the condition of step 411 is not satisfied, the BS proceeds to step 415.

In step 415, the BS determines if the P2P connection is unset. If the P2P connection unsetting is not determined, the BS may return to step 407 and determine the P2P connection setting. However, if the P2P connection unsetting is detected, the BS may proceed to step 417 and decrease the P2P communication count (n) by '1' (i.e., n=n−1).

In step 419, the BS determines if the P2P communication count (n) is equal to '0'. That is, the BS determines if P2P connections are all unset. If it is determined that the P2P communication count (n) is equal to '0', the BS may determine that the P2P communications are all unset and, in step 421, the BS may unset the allocated P2P zone within a frame (i.e., m=0). The unset P2P zone may be used for general communication in a BS. Thereafter, the BS terminates the procedure.

However, in step 419, if it is determined that the P2P communication count (n) is equal to or is greater than '1', the BS may proceed to step 423. In step 423, the BS determines if the current channel count (m) is greater than the P2P communication count (n). If the condition of step 423 is satisfied, in step 425, the BS may unset a channel with no P2P communication, i.e., coordinate the P2P zone among currently allocated channels and decrease the channel count (m) by '1' (i.e., m=m−1). The BS returns to step 407. If the condition of step 423 is not satisfied, the BS returns to step 407.

Figure 5:
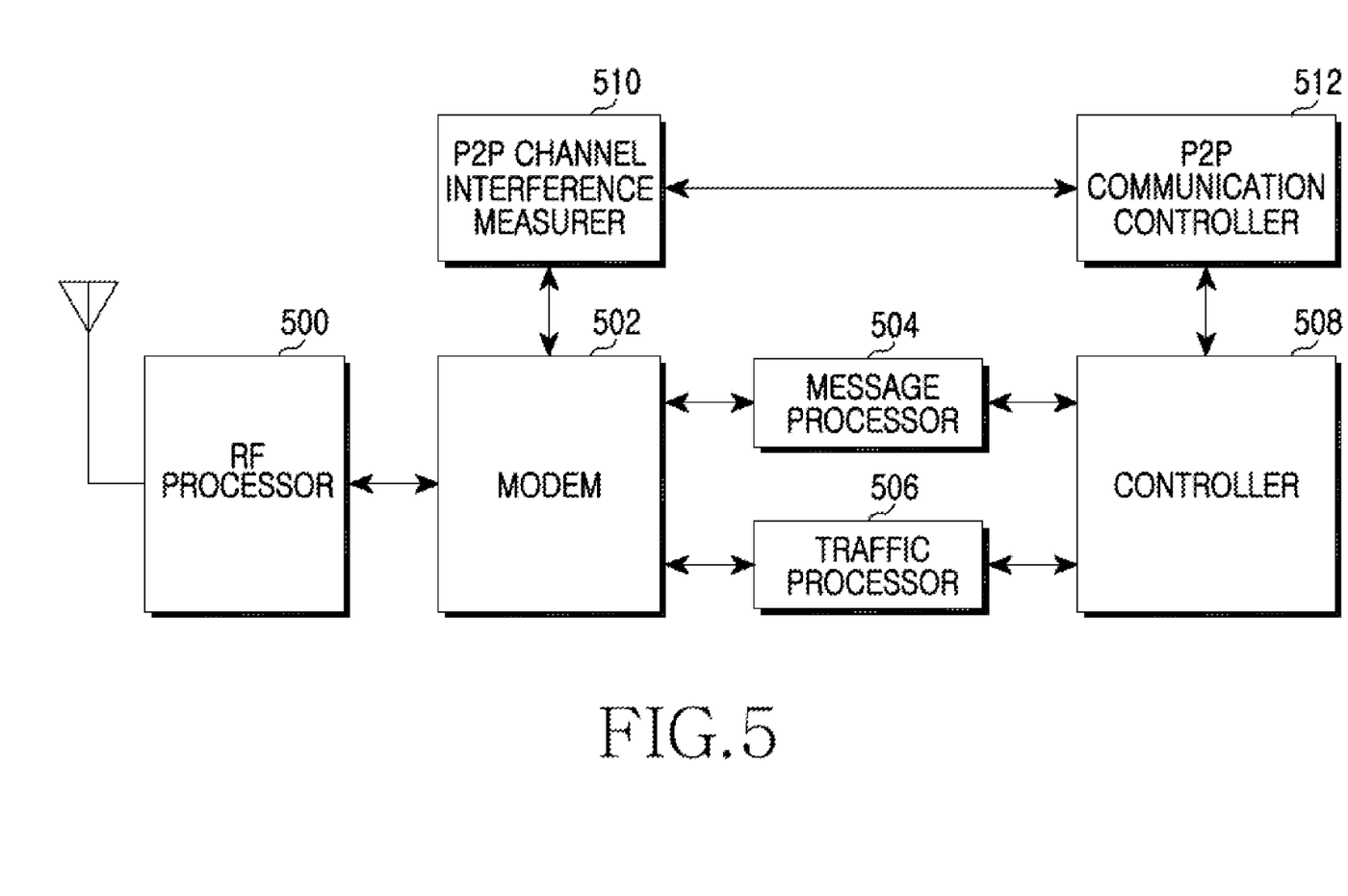
FIG. 5 is a block diagram illustrating a construction of an MS supporting a P2P mode in a broadband wireless communication system according to an exemplary embodiment of the present invention.

FIG. 5 is a block diagram illustrating a construction of an MS supporting a P2P mode in a broadband wireless communication system according to an exemplary embodiment of the present invention.

Referring to FIG. 5, the MS includes a Radio Frequency (RF) processor 500, a modulator/demodulator (modem) 502, a message processor 504, a traffic processor 506, a controller 508, a P2P channel interference measurer 510, and a P2P communication controller 512.

The RF processor 500 converts an RF band signal received through at least one antenna into a baseband signal, converts the baseband signal into digital sample data, and provides the digital sample data to the modem 502. Also, the RF processor 500 converts baseband sample data from the modem 502 into a baseband analog signal, converts the baseband analog signal into an RF band signal, and transmits the RF band signal through at least one antenna.

The modem 502 physical-layer-demodulates the signal from the RF processor 500 and restores the signal to information data (i.e., received packets). In a case where the information data is a signaling message, the modem 502 provides the information data to the message processor 504. In a case where the information data is traffic data, the modem 502 provides the information data to the traffic processor 506. Here, in an OFDM/OFDMA-based system, the modem 502 may process sample data from the RF processor 500 by OFDM demodulation (i.e., Fast Fourier Transform (FFT) operation) and convert the sample data into frequency domain data. The modem 502 may also process the frequency domain data by channel demodulation and channel decoding and restore the frequency domain data to the original information data. Also, the modem 502 physical-layer-modulates transmission packets (i.e., a transmission message) from the message processor 504 and the traffic processor 506, and provides the modulated packets to the RF processor 500. In the OFDM/OFDMA-based system, the modem 502 processes transmission packets by channel coding and channel modulation, processes the channel-modulated data by OFDM-modulation (i.e., Inverse Fast Fourier Transform (IFFT) operation), and converts the data into time domain sample data.

In a reception mode, the message processor 504 protocol-processes a receive signaling message (i.e., control message or Media Access Control (MAC) management message) from the modem 502. In a transmission mode, the message processor 504 generates a transmit signaling message and provides the transmit signaling message to the modem 502. Here, it is assumed that the message processor 504 processes all of signaling messages associated with general-mode communication and P2P-mode communication.

In a reception mode, the traffic processor 506 protocol-processes a receive traffic from the modem 502. In a transmission mode, the traffic processor 506 protocol-processes a transmit traffic and provides the processed traffic to the modem 502. Here, it is assumed that the traffic processor 506 processes all traffic associated with general-mode communication and P2P-mode communication.

Also, the modem 502 extracts a signal of each channel of a P2P zone and provides the extracted signal to the P2P channel interference measurer 510. The P2P channel interference measurer 510 measures an interference sum (e.g., an RSSI sum) of each channel using a signal of each channel from the modem 502, and provides the measured interference sum to the P2P communication controller 512.

The controller 508 takes charge of a general control related to MS operation and communication. Also, the controller 508 interworks with the P2P communication controller 512 and takes charge of a general control for P2P communication. For example, the controller 508 may exchange information necessary for P2P communication, with the P2P communication controller 512.

In a case where a P2P connection is set, the P2P communication controller 512 performs a function of selecting a channel advantageous to the MS. The P2P communication controller 512 is reported information regarding an interference sum of each P2P channel from the P2P channel interference measurer 510, selects a channel of the least interference sum, and provides the selected channel to the controller 508. Accordingly, the controller 508 may generate a signaling message including information regarding the selected channel and provide the signaling message to the message processor 504. The signaling message may be physical-layer-processed for transmission and transmitted to a BS. The MS performs P2P communication through the selected channel. At this time, a transmit MS and a receive MS may competitively acquire resources within the selected channel and perform P2P communication with each other. One example of a resource acquisition scheme may be a CSMA scheme of an ad-hoc network, and the like.

On the other hand, the P2P communication controller 512 may be reported information regarding interference sums of P2P channels from the P2P channel interference measurer 510 at regular intervals (or according to an event or request), compare the reported interference sums of the respective channels with each other, and perform a channel change. If it is determined that the channel change is necessary, the P2P communication controller 512 shall provide changed channel information to the controller 508, and the controller 508 shall transmit the changed channel information to the BS. The MS may perform P2P communication through a changed channel.

Figure 6:
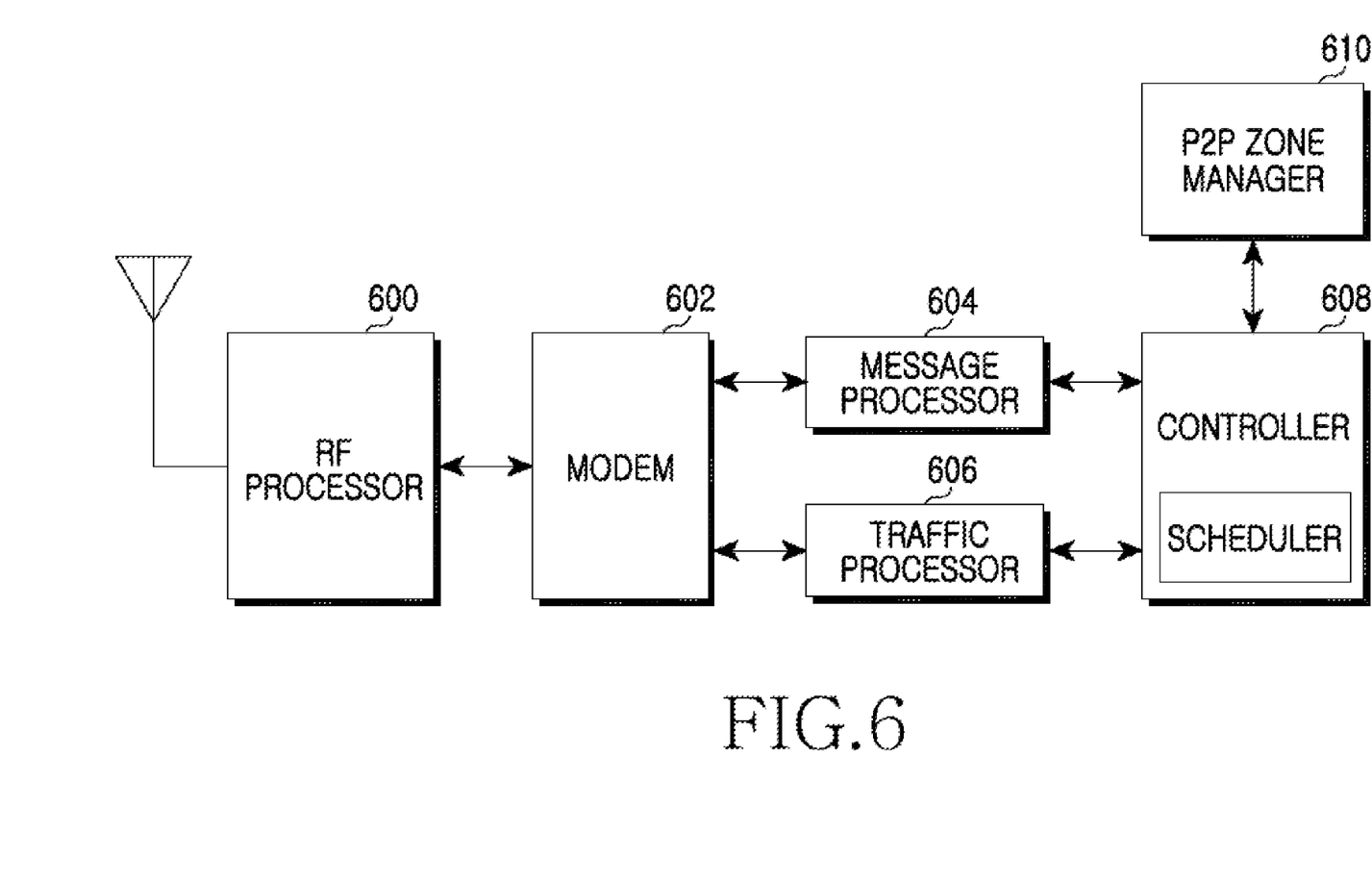
FIG. 6 is a block diagram illustrating a construction of a BS supporting a P2P mode in a broadband wireless communication system according to an exemplary embodiment of the present invention.

FIG. 6 is a block diagram illustrating a construction of a BS supporting a P2P mode in a broadband wireless communication system according to an exemplary embodiment of the present invention.

Referring to FIG. 6, the BS includes an RF processor 600, a modem 602, a message processor 604, a traffic processor 606, a controller 608, and a P2P zone manager 610. Here, general operations of the RF processor 600, the modem 602, the message processor 604, and the traffic processor 606 are the same as corresponding elements of FIG. 5. Thus, a detailed description herein is omitted.

Referring to FIG. 6, the controller 608 controls the BS operation and communication. Also, the controller 608 interworks with the P2P zone manager 610 and performs control for P2P communication. For example, the controller 608 may exchange information necessary for P2P communication, with the P2P zone manager 610, and process signaling for P2P communication.

The controller 608 also includes a scheduler. The scheduler performs resource scheduling for a frame. For example, the scheduler may determine scheduling priority for Service Flows (SFs) and, according to the determined priority, the scheduler may allocate a Modulation and Coding Scheme (MCS) level and a radio resource (e.g., a slot) for each SF (or MS). Also, the scheduler may interwork with the P2P zone manager 610 and allocate a P2P zone within a frame.

If the resource allocation is completed, the scheduler may provide the scheduling result (e.g., the resource allocation result) to the message processor 604. Accordingly, the message processor 604 may generate a resource allocation message (e.g., a MAP message) using the scheduling result and provide the resource allocation message to the modem 602. The resource allocation message is physical-layer-processed for transmission and is transmitted to MSs.

The P2P zone manager 610 coordinates a zone for P2P communication adaptively to a currently set P2P connection (or communication), and provides the coordination result to the controller 608. For example, in a case where an initial P2P connection is set, the P2P zone manager 610 sets a channel count (m) within a P2P zone as '1', and sets a P2P communication count (n) as '1'. Whenever a P2P connection is set, the P2P zone manager 610 increases the P2P communication count (n) and, whenever the P2P connection is unset, the P2P zone manager 610 decreases the P2P communication count (n). If m<M and n>m, the P2P zone manager 610 may increase the channel count (i.e., m=m+1). If n<m, the P2P zone manager 610 may unset a channel with no P2P connection (i.e., m=m−1). Here, the 'M' denotes the maximum channel count assignable within the P2P zone.

As described above, the P2P zone manager 610 coordinates a channel count within a P2P zone adaptively to the number of currently set P2P connections, and provides the coordinated channel count to the controller 608. Accordingly, the scheduler shall allocate a P2P zone for P2P communication within a frame duration according to the channel count. However, in a case where P2P connections are all unset (i.e., n=0), the P2P zone manager 610 notifies the controller 608 of the unsetting and the scheduler unsets a set P2P zone within a frame duration and uses the unset resource for general communication.

An experiment result proving a performance of an exemplary embodiment of the present invention is described below.

An experiment environment is given in Table 1 below.

TABLE 1

| Simulation settings | |
| --- | --- |
| Cell layout | Single cell |
| Bandwidth | 10 MHz |
| BS power | 20 W |
| MS power | 200 mW |
| Path-loss model | Path-loss exponent = 3.76, K = −16.62 |
| Scheduling | proportional fair scheduler |
| Contention | CSMA/CA, 4 contention channels |

In the experiment environment such as Table 1, a simulation was conducted changing a probability that a receive MS will exist within the same cell.

Figure 7:
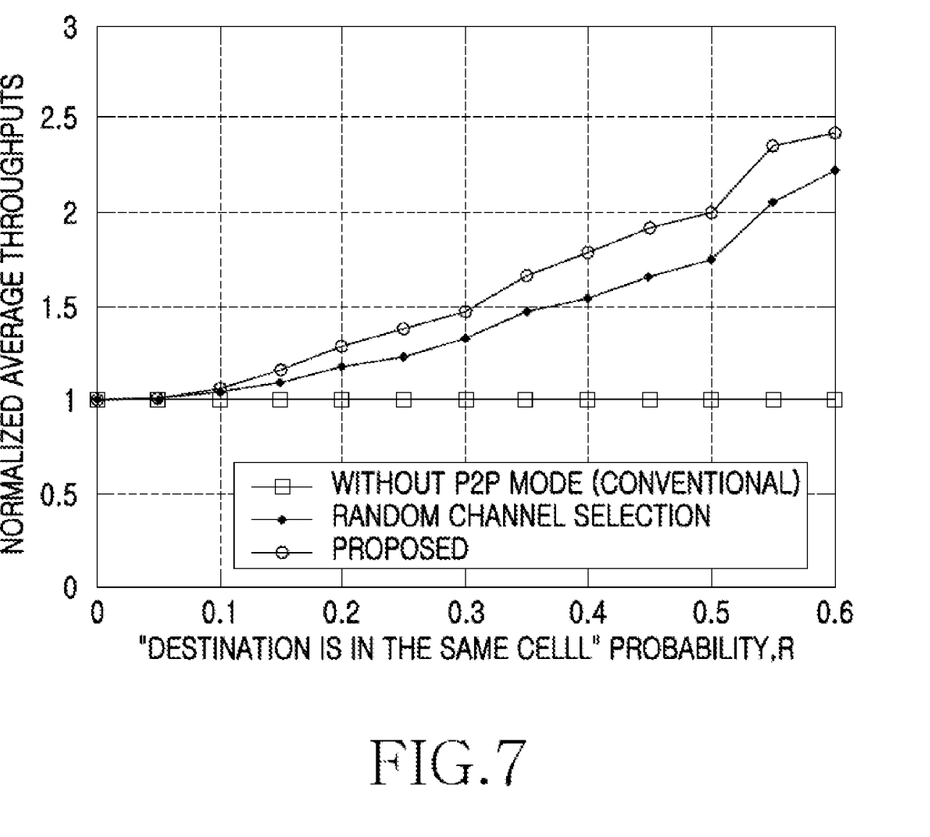
FIG. 7 is a graph illustrating a simulation result comparing conventional average throughputs not supporting P2P communication and average throughputs supporting P2P communication according to an exemplary embodiment of the present invention.

FIG. 7 is a graph illustrating a simulation result comparing conventional average throughputs not supporting P2P communication and average throughputs supporting P2P communication according to an exemplary embodiment of the present invention. In the graph illustrated, horizontal axis represents a probability that a receive MS (i.e., a destination) will exist within the same cell radius of 0.5 km, and vertical axis represents average throughputs.

Referring to FIG. 7, compared to the conventional art not supporting P2P communication (without P2P mode), an exemplary embodiment of the present invention may greatly improve an average throughput. Also, compared to a conventional scheme of selecting a channel in a random fashion, an exemplary embodiment of the present invention may improve the average throughput (i.e., average data rate).

As described above, exemplary embodiments of the present invention have an advantage of minimizing overhead resulting from resource allocation because a BS allocates only a resource zone for P2P communication and P2P-mode MSs select a favorable channel and competitively communicate with each other. Also, exemplary embodiments of the present invention have an advantage of acquiring a high data rate because an MS selects a channel with a less interference sum, i.e., selects a channel with good resource utilization efficiency and performs communication. Further, exemplary embodiments of the present invention have an advantage of maximizing a gain of space reuse by allowing the use of the same channel for P2P connections of less mutual interference. As described above, exemplary embodiments of the present invention have an advantage in which, by selecting a channel through simple measurement, complexity is low, scheduling of a BS is unnecessary, and a signaling overhead between a BS and an MS is reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a Mobile Station (MS) in a wireless communication system supporting Peer to Peer (P2P) communication,
    wherein a P2P zone within a frame used for the P2P communication includes at least one channel, each channel comprises a broadcasting zone and a contention zone, and a P2P-mode transmit MS transmits a reference signal through a broadcasting zone of a channel to which it belongs,
    the method comprising:
    receiving information of the P2P zone including at least one channel allocated from a Base Station (BS);
    determining an interference sum for each channel within the P2P zone;
    comparing the determined interference sums with each other;
    selecting a channel comprising the least interference sum; and
    transmitting P2P connection information including information regarding the selected channel to the BS.

2. The method of claim 1, further comprising, after transmitting the selected channel information, performing P2P communication with a called MS through the selected channel.

3. The method of claim 2, wherein the P2P communication is performed in a contention scheme.

4. The method of claim 3, wherein the contention scheme comprises a Carrier Sense Multiple Access (CSMA) scheme.

5. The method of claim 2, further comprising, during the P2P communication:
    determining an interference sum for each channel within the P2P zone;
    comparing the determined interference sums with each other, and selecting a channel comprising the least interference sum; and
    if the selected channel is different from a current in-communication channel, performing a channel change.

6. The method of claim 5, wherein the performing of the channel change comprises:
    generating a random number;
    comparing the generated random number with a preset probability value;
    if the random number is greater than the probability value, changing a channel; and
    transmitting information regarding the changed channel to the BS.

7. The method of claim 1, wherein the determining of the interference sum comprises measuring a Received Signal Strength Indicator (RSSI) of a signal received at a broadcasting zone of each channel.

8. An operation method of a Base Station (BS) in a wireless communication system supporting a Peer to Peer (P2P) mode, the method comprising:
    determining a currently set P2P connection count based on P2P connection information received from at least one Mobile Station (MS);
    determining a channel count within a P2P zone adaptively to the currently set P2P connection count; and
    variably assigning a P2P zone to a frame duration according to the determined channel count.

9. The method of claim 8, wherein the determining of the channel count comprises:
    increasing a P2P connection count whenever a P2P connection is set, and decreasing the P2P connection count whenever the P2P connection is unset;
    increasing the channel count within the P2P zone whenever a channel within the P2P zone is set, and decreasing the channel count whenever the channel is unset;
    if the channel count is less than a preset maximum channel count and is less than the P2P connection count, additionally setting a channel; and
    if the P2P connection count is less than the channel count, unsetting a channel with no P2P connection.

10. The method of claim 8, further comprising, if all P2P connections are unset, unsetting the assigned P2P zone.

11. The method of claim 8, wherein the P2P zone comprises at least one channel, each channel comprises a broadcasting zone and a contention zone, and a P2P-mode transmit Mobile Station (MS) transmits a reference signal through a broadcasting zone of a channel to which it belongs.

12. A Mobile Station (MS) apparatus in a wireless communication system supporting Peer to Peer (P2P) communication,
    wherein a P2P zone within a frame used for the P2P communication includes at least one channel, each channel includes a broadcasting zone and a contention zone, and a P2P-mode transmit MS transmits a reference signal through a broadcasting zone of a channel to which it belongs,
    the apparatus comprising:
    a P2P channel interference measurer for determining an interference sum for each channel within the P2P zone including at least one channel allocated from a Base Station (BS);
    a P2P communication controller for comparing the determined interference sums with each other, and for selecting a channel comprising the least interference sum; and
    a message processor for transmitting P2P connection information including information regarding the selected channel to the BS.

13. The apparatus of claim 12, further comprising a controller for, after transmitting the selected channel information, performing a control for P2P communication with a called MS through the selected channel.

14. The apparatus of claim 13, wherein the P2P communication is performed in a contention scheme.

15. The apparatus of claim 14, wherein the contention scheme comprises a Carrier Sense Multiple Access (CSMA) scheme.

16. The apparatus of claim 13, wherein, during the P2P communication, the P2P channel interference measurer determines an interference sum for each channel within the P2P zone.

17. The apparatus of claim 16, wherein, during the P2P communication, the P2P communication controller compares the determined interference sums with each other, selects a channel comprising the least interference sum and, if the selected channel is different from a current in-communication channel, performs a channel change.

18. The apparatus of claim 17, wherein the P2P communication controller generates a random number, compares the generated random number with a preset probability value and, if the random number is greater than the probability value, changes a channel.

19. The apparatus of claim 18, wherein the message processor transmits information regarding the changed channel to the BS.

20. The apparatus of claim 12, wherein the P2P channel interference measurer measures a Received Signal Strength Indicator (RSSI) of a signal received at a broadcasting zone of each channel.

21. A Base Station (BS) apparatus in a wireless communication system supporting a Peer to Peer (P2P) mode, the apparatus comprising:

a P2P zone manager for determining a currently set P2P connection count based on P2P connection information received from at least one Mobile Station (MS) and determining a channel count within a P2P zone adaptively to the currently set P2P connection count; and a scheduler for variably assigning a P2P zone to a frame duration according to the determined channel count.

22. The apparatus of claim 21, wherein the P2P zone manager:

increases a P2P connection count whenever a P2P connection is set and decreases the P2P connection count whenever the P2P connection is unset, and increases the channel count within the P2P zone whenever a channel within the P2P zone is set and decreases the channel count whenever the channel is unset;

additionally sets a channel if the channel count is less than the preset maximum channel count and is less than the P2P connection count; and unsets a channel with no P2P connection if the P2P connection count is less than the channel count.

23. The apparatus of claim 21, wherein, if all P2P connections are unset, the scheduler unsets the assigned P2P zone.

24. The apparatus of claim 21, wherein the P2P zone comprises at least one channel, each channel comprises a broadcasting zone and a contention zone, and a P2P-mode transmit Mobile Station (MS) transmits a reference signal through a broadcasting zone of a channel to which it belongs.

\* \* \* \* \*